US007563297B2

(12) United States Patent
Kim

(10) Patent No.: US 7,563,297 B2
(45) Date of Patent: Jul. 21, 2009

(54) MULTI-CYCLONE DUST SEPARATING APPARATUS

(75) Inventor: Kyoung-woung Kim, Gwangju (KR)

(73) Assignee: Samsung Gwangju Electronics Co., Ltd., Gwangju (KR)

( * ) Notice: Subject to any disclaimer, the term of this patent is extended or adjusted under 35 U.S.C. 154(b) by 603 days.

(21) Appl. No.: 11/349,784

(22) Filed: Feb. 8, 2006

(65) Prior Publication Data

US 2006/0286499 A1 Dec. 21, 2006

(30) Foreign Application Priority Data

Jun. 14, 2005 (KR) ...................... 10-2005-0050917

(51) Int. Cl.
*B01D 45/12* (2006.01)

(52) U.S. Cl. ............................ 55/343; 55/346; 55/416; 55/424; 55/429; 55/DIG. 3

(58) Field of Classification Search .................. 55/343, 55/346, 349, 416, 424, 429, 459.1, DIG. 3
See application file for complete search history.

(56) References Cited

U.S. PATENT DOCUMENTS

| | | | | |
|---|---|---|---|---|
| 3,200,568 | A * | 8/1965 | McNeil | 96/195 |
| 3,960,734 | A | 6/1976 | Zagorski | 210/512 |
| 7,097,680 | B2 * | 8/2006 | Oh | 55/343 |
| 2003/0159238 | A1 | 8/2003 | Oh | 15/353 |

FOREIGN PATENT DOCUMENTS

| | | |
|---|---|---|
| CN | 1593322 | 3/2005 |
| FR | 2859373 | 3/2005 |
| GB | 2360719 | 10/2001 |
| KR | 1020040050618 | 6/2004 |
| KR | 1020050025711 | 3/2005 |
| WO | WO 00/64321 | 11/2000 |
| WO | WO 02/067756 | 9/2002 |

OTHER PUBLICATIONS

Office Action dated Sep. 28, 2007 corresponding to Chinese Patent Application No. 200610057080X.

Extended European Search Report dated Aug. 7, 2007 corresponding to European Patent Application No. 06290378.6.

* cited by examiner

*Primary Examiner*—Robert A Hopkins
(74) *Attorney, Agent, or Firm*—Ohlandt, Greeley, Ruggiero & Perle, L.L.P.

(57) ABSTRACT

Disclosed is a multi-cyclone dust separating apparatus including a primary cyclone for centrifugally separating impurities from the sucked air, a plurality of secondary cyclones for centrifugally separating impurities from the air supplied from the primary cyclone, inflow guide paths for guiding the air discharged from the primary cyclone to the plurality of secondary cyclones, and discharge guide tubes partially inserted into the secondary cyclones, for externally discharging the air of the secondary cyclones. The discharge guide tubes include cylindrical portions having a predetermined height, and intercepting portions extended from the bottom ends of the cylindrical portions by a predetermined length, for preventing the air supplied to the secondary cyclones from being directly discharged to the discharge guide tubes.

11 Claims, 7 Drawing Sheets

| Change Feature | i | ii | iii | iv | v | vi |
|---|---|---|---|---|---|---|
| |  |  |  |  |  |  |
| Pressure Drop ,(mmH20) | 401 | 392 | 386 | 423 | 442 | 293 |
| Efficiency,(%) | 97.98 | 98.12 | 98.65 | 98.60 | 98.43 | 99.10 |

MULTI-CYCLONE DUST SEPARATING APPARATUS

CROSS-REFERENCE TO RELATED APPLICATIONS

This application claims benefit under 35 U.S.C. §119(a) of Korean Patent Application No. 2005-50917, filed Jun. 14, 2005 in the Korean Intellectual Property Office, the entire contents of which are incorporated herein by reference.

BACKGROUND OF THE INVENTION

1. Field of the Invention

The present invention relates to a vacuum cleaner, and more particularly, to a multi-cyclone dust separating apparatus that can centrifugally separate impurities from the sucked air.

2. Description of the Related Art

In general, a vacuum cleaner includes a suction brush for sucking the air containing impurities from the bottom, a dust separating apparatus for separating the impurities from the air sucked through the suction brush, and a suction motor that generates a suction driving source. The dust separating apparatus normally uses a dust bag. The dust bag is frequently replaced and unsanitary. Accordingly, a multi-cyclone dust separating apparatus that can be semipermanently used without a dust bag has been recently widely used.

The cyclone dust separating apparatus is a dust separating apparatus that centrifugally separates impurities from the air by rotating the air containing the impurities. The cyclone dust separating apparatus includes a cyclone body (not shown), an air inflow hole formed on the side of the cyclone body, and a discharge guide tube (not shown) installed at the upper portion thereof. However, the air supplied to the cyclone body rotates and collides with the discharge air discharged through the discharge guide tube, thereby causing a pressure drop and a reduction in the suction force. Particularly, a multi-cyclone dust separating apparatus having a plurality of cyclones to improve the dust collecting efficiency has such problems in the secondary or tertiary cyclones composed of a plurality of small cyclones.

A multi-cyclone dust separating apparatus (having a primary cyclone and a plurality of secondary cyclones) filed by the present applicant (Korean Publication No. 10-2005-0025711) will now be briefly explained with reference to FIG. 1. Referring to FIG. 1, the multi-cyclone dust separating apparatus 10 includes a primary cyclone 30 for primarily centrifugally separating impurities from the sucked air, secondary cyclones 40 for secondarily centrifugally separating impurities from the air supplied from the primary cyclone 30, a dust collecting vessel 20 for collecting the impurities separated from the air in the primary and secondary cyclones 30 and 40, an inflow/outflow cover 50 for guiding the air discharged from the primary cyclone 30 to the secondary cyclones 40, and a cyclone cover 60 for externally discharging the air from the inflow/outflow cover 50 to the outer space of the dust separating apparatus.

The plurality of secondary cyclones 40 are disposed on the outer circumference of the primary cyclone 30 at predetermined intervals, for centrifugally separating minute dusts that have not been separated from the air in the primary cyclone 30. On the other hand, a grill member 34 is installed in the primary cyclone 30, for preventing the impurities from flowing backward and being discharged through an air outflow hole 33 of the primary cyclone 30. The inflow/outflow cover 50 includes inflow guide tubes 52 for guiding the air discharged from the primary cyclone 30 to the secondary cyclones 40, and discharge guide tubes 53 for externally discharging the air of the secondary cyclones 40. The predetermined portions of the discharge guide tubes 53 are inserted into the secondary cyclones 40. A suction motor (not shown) of a vacuum cleaner is directly or indirectly connected to a discharge port 61 of the cyclone cover 60.

The operation of the multi-cyclone dust separating apparatus 10 will now be described. When power is applied to the vacuum cleaner and the suction motor (not shown) is driven, the outside air is supplied to the primary cyclone 30 through the suction port 37, and the impurities in the outside air are primarily centrifugally separated and collected in the dust collecting vessel 20. The air separated from the impurities passes through the grill member 34, is distributed along the inflow guide tubes 52 of the inflow/outflow cover 50, and supplied to the plurality of secondary cyclones 20. The impurities of the air are secondarily centrifugally separated and collected in the dust collecting vessel 20. The air separated from the impurities is ascended, collected in the cyclone cover 60 through the discharge guide tubes 53, and externally discharged from the multi-cyclone dust separating apparatus 10 through the discharge port 61.

The multi-cyclone dust separating apparatus 10 has high dust collecting efficiency because the plurality of secondary cyclones 40 are disposed on the outer circumference of the primary cyclone 30, for sequentially centrifugally separating the impurities of the air.

However, the multi-cyclone dust separating apparatus 10 has the following problems.

First, when the air discharged from the primary cyclone 30 is supplied to the secondary cyclones 40 through the inflow guide tubes 52, as indicated by arrows A, most of the air is not supplied to the lower portions of the secondary cyclones 40 but directly discharged to the discharge guide tubes 53 by the suction force of the discharge guide tubes 53. Therefore, the minute impurities that have not been filtered in the primary cyclone 30 are externally discharged through the cyclone cover 60 with the air, thereby reducing the dust collecting efficiency of the multi-cyclone dust separating apparatus 10.

In order to solve the foregoing problem, the discharge guide tubes 53 can be inserted deeper into the secondary cyclones 40. However, the air supplied to the secondary cyclones 40 seriously collides with the discharge guide tubes 53 to cause the pressure drop and reduce the suction force. If the suction force decreases, the secondary cyclones 40 cannot form a proper rotary current, thereby reducing the dust collecting efficiency.

Second, the air centrifugally separated from the impurities in the primary cyclone 30 is ascended through the grill member 34 and supplied to the secondary cyclones 40 through the air outflow hole 33. Here, the air supplied from the four directions is mixed and eddied inside the grill member 34, to generate an eddy current. As a result, the pressure drop is generated in the air, and the suction force of the suction motor is reduced due to the air pressure drop.

SUMMARY OF THE INVENTION

Accordingly, it is an object of the present invention to provide a multi-cyclone dust separating apparatus that can maintain an appropriate suction force and prevent pressure drop, by restricting mixing of the air supplied to cyclones and the air discharged through discharge guide tubes.

Another object of the present invention is to provide a multi-cyclone dust separating apparatus that can prevent pressure drop by collision of the air passing through a grill member for filtering off dusts from different directions.

In order to achieve the above objects of the invention, there is provided a cyclone dust separating apparatus, including: a cyclone body having an air inflow hole through that the outside air containing impurities is sucked; and a discharge guide tube for discharging the air from the cyclone body, the discharge guide tube including a cylindrical portion, and an intercepting portion extended from the bottom end of the cylindrical portion for preventing the air supplied to the cyclone body from being directly discharged to the discharge guide tube. Therefore, the cyclone dust separating apparatus can maintain an appropriate suction force, restricting mixing of the air supplied to the cyclone body and the discharged air.

Preferably, the intercepting portion is installed at the lower end of the cylindrical portion vertically under the end point of the air inflow hole of the cyclone body, and is circular-arc-shaped.

According to one aspect of the invention, there is provided a multi-cyclone dust separating apparatus, including: a primary cyclone for centrifugally separating impurities from the sucked air; a plurality of secondary cyclones for centrifugally separating impurities from the air supplied from the primary cyclone; inflow guide paths for guiding the air discharged from the primary cyclone to the plurality of secondary cyclones; and discharge guide tubes partially inserted into the secondary cyclones, for externally discharging the air of the secondary cyclones. The discharge guide tubes include cylindrical portions, and intercepting portions extended from the bottom ends of the cylindrical portions, for preventing the air supplied to the secondary cyclones from being directly discharged to the discharge guide tubes.

Preferably, the multi-cyclone dust separating apparatus further includes an inflow/outflow cover installed on the top ends of the secondary cyclones, wherein the plurality of secondary cyclones are disposed at an outer circumference of the primary cyclone at predetermined intervals, and the inflow guide paths and the discharge guide tubes are integrally formed on the inflow/outflow cover.

Preferably, the intercepting portions are installed at the lower ends of the cylindrical portions vertically under the end points of the air inflow holes of the secondary cyclones, and are circular-arc-shaped.

Preferably, the length of the circular arc of the intercepting portion ranges from ⅓ to ⅔ of the circular circumference of the cylindrical portion, and more preferably, the length of the intercepting portion ranges from ¼ to ½ of the length of the cylindrical portion.

Preferably, in the multi-cyclone dust separating apparatus, the primary cyclone includes a cylindrical grill member installed on an air outflow hole through which the air is discharged, for preventing backflow of impurities. The grill member includes an air guide member protruded from the bottom in the height direction, for guiding the air passing through the grill member to the air outflow hole.

Preferably, the air guide member divides the inside area of the grill member into a plurality of uniform areas. More preferably, the air guide member has a cross-shaped section to divide the inside area of the grill member into four areas.

BRIEF DESCRIPTION OF THE DRAWINGS

The above aspects and features of the present invention will be more apparent by describing certain embodiments of the present invention with reference to the accompanying drawings, in which.

DETAILED DESCRIPTION OF THE PREFERRED EMBODIMENTS

A multi-cyclone dust separating apparatus in accordance with the present invention will now be described in detail with reference to the accompanying drawings.

Figure 2:
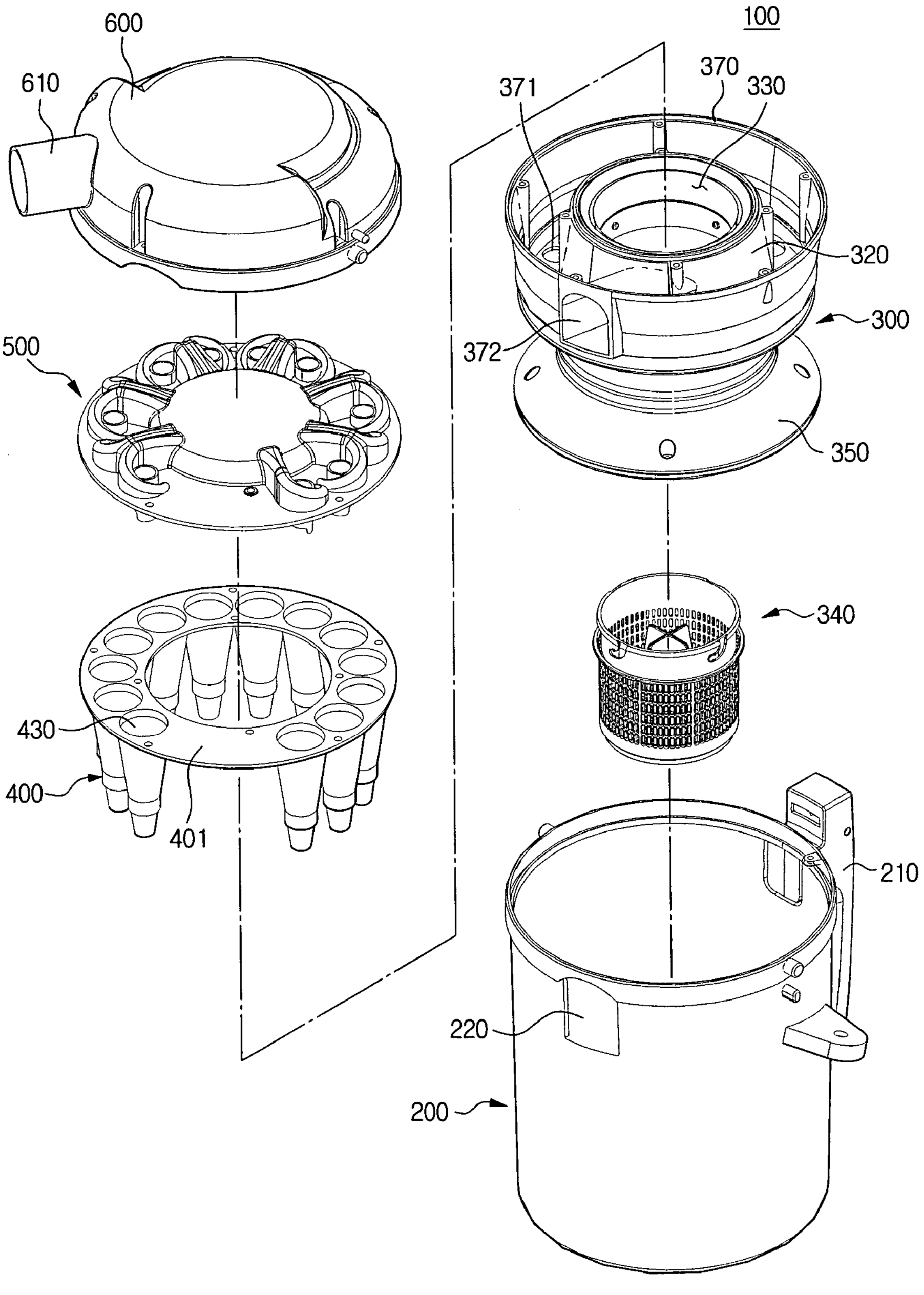
FIG. 2 is a disassembled perspective view illustrating a multi-cyclone dust separating apparatus in accordance with the present invention.

As illustrated in FIG. 2, the multi-cyclone dust separating apparatus 100 includes a dust collecting housing 200, a primary cyclone 300 installed in the dust collecting housing 200, a plurality of secondary cyclones 400 installed in the dust collecting housing 200 on the outer circumference of the primary cyclone 300 at predetermined intervals, an inflow/outflow cover 500 coupled to the upper portions of the primary and secondary cyclones 300 and 400, and a cyclone cover 600 coupled to the upper portion of the inflow/outflow cover 500.

The primary cyclone 300 primarily centrifugally separates and removes relatively large impurities of the sucked air, and the secondary cyclones 400 secondarily centrifugally separate and remove minute impurities of the air supplied from the primary cyclone 300. The dust collecting housing 200 collects the impurities separated from the air in the primary and secondary cyclones 300 and 400. The inflow/outflow cover 500 distributes the air from the primary cyclone 300 to the plurality of secondary cyclones 400 and discharges the air from the secondary cyclones 400. The cyclone cover 600 collects the air discharged through the inflow/outflow cover 500 and externally discharges the collected air from the multi-cyclone dust separating apparatus 100.

The dust collecting housing 200 is formed in a cylindrical shape having its top end opened and its bottom end closed, and composes the outer appearance of the multi-cyclone dust separating apparatus 100. A handle 210 is installed on one side wall of the dust collecting housing 200. On the other hand, a through hole 220 is formed on the other side wall of the dust collecting housing 200, so that the outside air can be sucked into the multi-cyclone dust separating apparatus 100.

Figure 3:
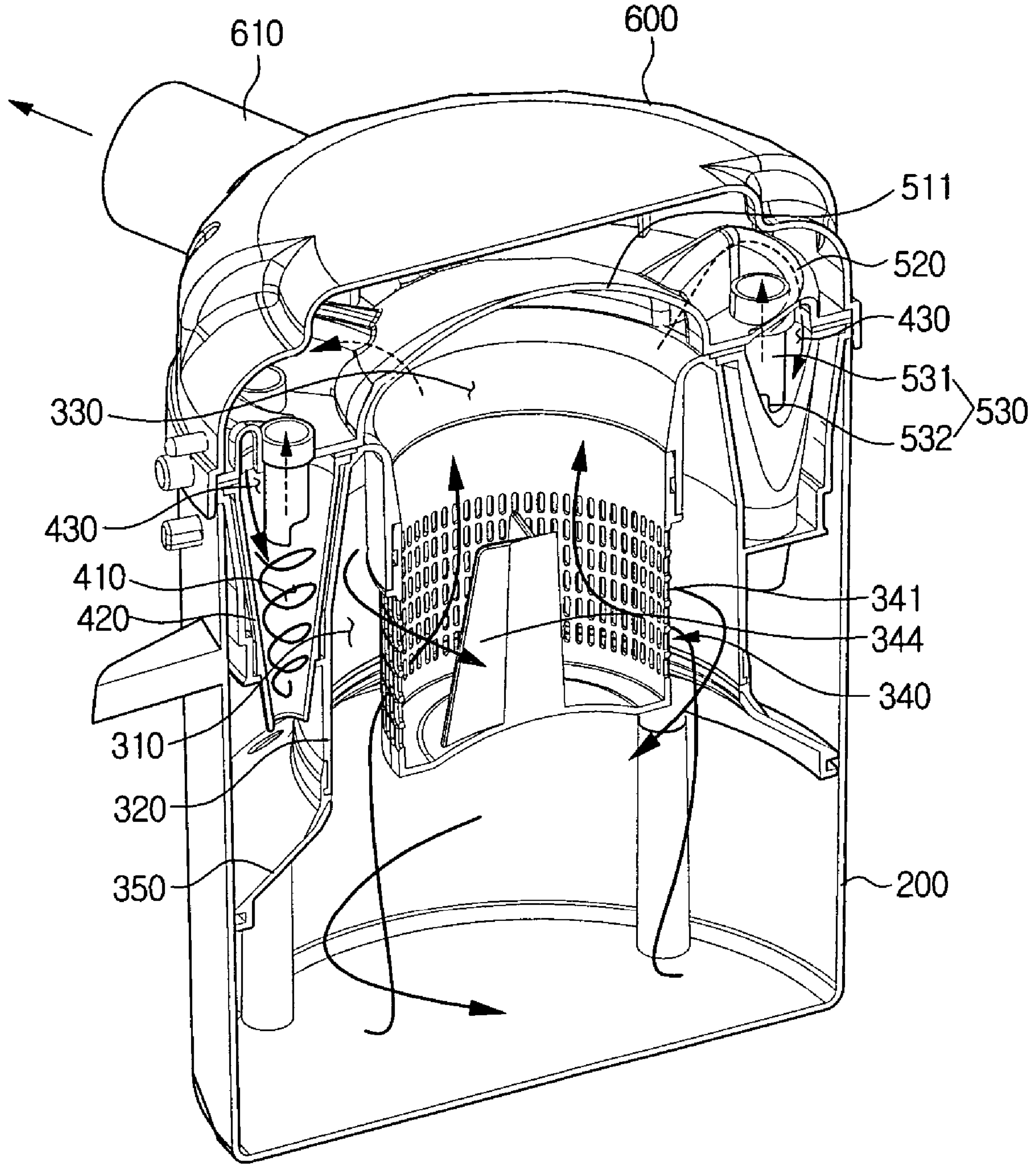
FIG. 3 is a partially-cut assembly perspective view illustrating the multi-cyclone dust separating apparatus in accordance with the present invention.

As shown in FIGS. 2 and 3, the primary cyclone 300 includes a first chamber outer wall 320 for forming a primary cyclone chamber 310, an air outflow hole 330 for discharging the air from the primary cyclone chamber 310, and a grill member 340.

Identically to the dust collecting housing 200, the first chamber outer wall 320 is formed in a cylindrical shape. The first chamber outer wall 320 has its lower portion opened and its upper portion opened through the air outflow hole 330. An inflow port 372 is connected to one side of the first chamber outer wall 320 for inflow of the outside air. The outside air supplied through the inflow port 372 forms a rotary current in the primary cyclone chamber 310. The impurities in the air are concentrated on the primary chamber outer wall 320 by the centrifugal force and separated from the air. The air separated from the impurities in the primary cyclone 310 is discharged from the primary cyclone 300 through the air outflow hole 330. The air outflow hole 330 is formed smaller than the diameter of the first chamber outer wall 320.

Figure 4:
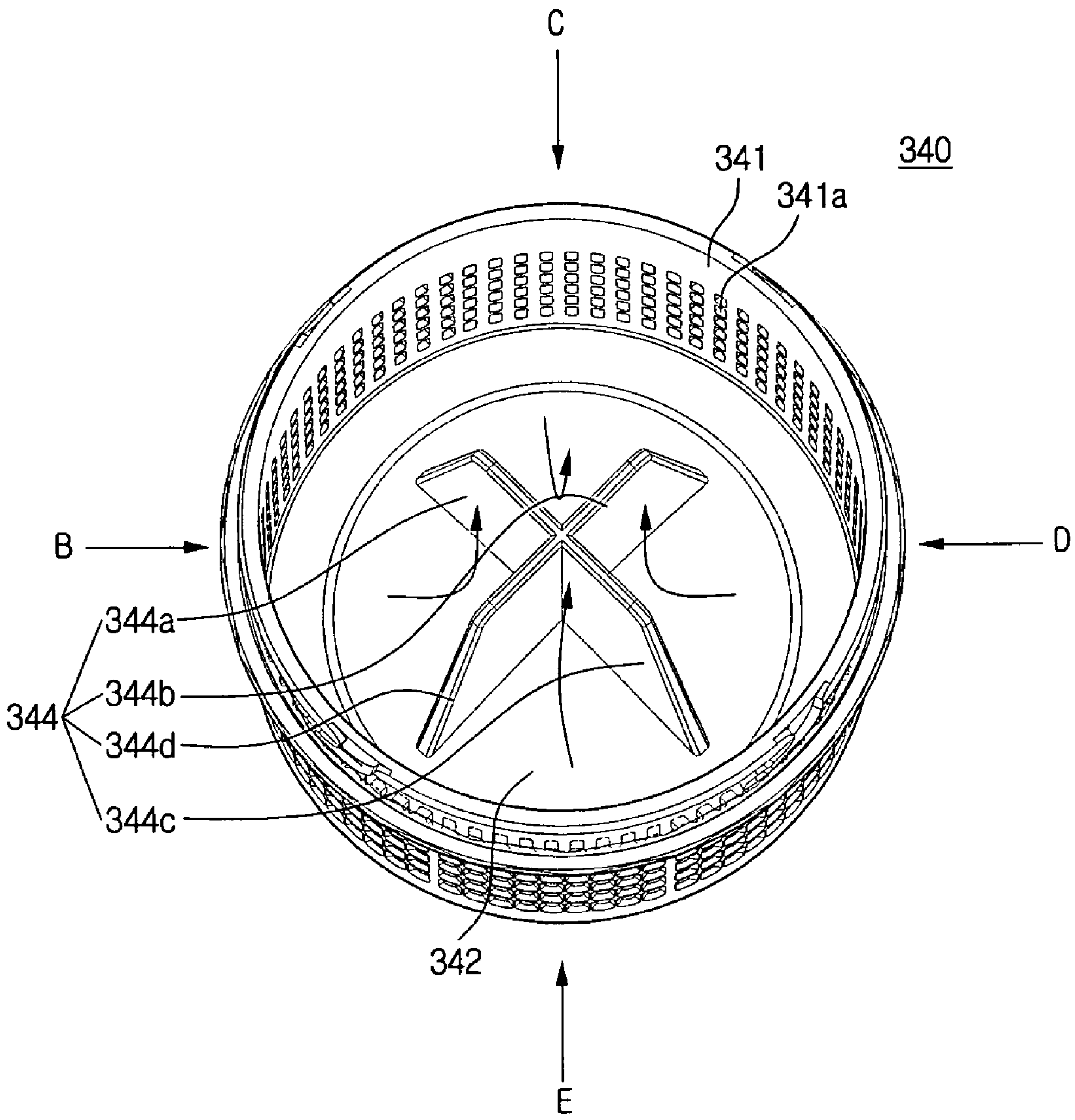
FIG. 4 is a plane perspective view illustrating a grill member of FIG. 2.

As depicted in FIGS. 3 and 4, the grill member 340 prevents relatively large impurities centrifugally separated in the primary cyclone chamber 310 from flowing backward and being discharged through the air outflow hole 330. The grill member 340 is formed in a cylindrical shape having its top end opened and its bottom end closed. In addition, a plurality of minute holes 341a are formed on the side 341 of the grill member 340.

In addition, grill member 340 includes an air guide member 344 protruding from the bottom 342 of the grill member 340 by a predetermined height. The air guide member 344 maintains upward flow of the air passing through the plurality of minute holes 341*a* of the side 341. Preferably, the air guide member 344 protrudes from the bottom 342 to a predetermined height that is substantially equal to the uppermost holes 341 a of the side 341.

Preferably, the air guide member 344 includes a plurality of members for uniformly dividing the inside area of the grill member 340. In this manner, the air containing the minute dusts enters the side 341 of the grill member 340 from four directions as indicated by arrows B, C, D and E. Therefore, still referring to FIG. 4, the air guide member 344 includes a first member 344a, a second member 344b, a third member 344c, and a fourth member 344d to divide the grill member 340 into four areas. That is, the air guide member 344 has a cross-shaped section. Accordingly, the air supplied from the four directions by the air guide member 344 is not mixed in the grill member 340. The first to fourth members 344*a* to 344*d* have their ends coupled to each other or are formed as a single body.

Figure 1:
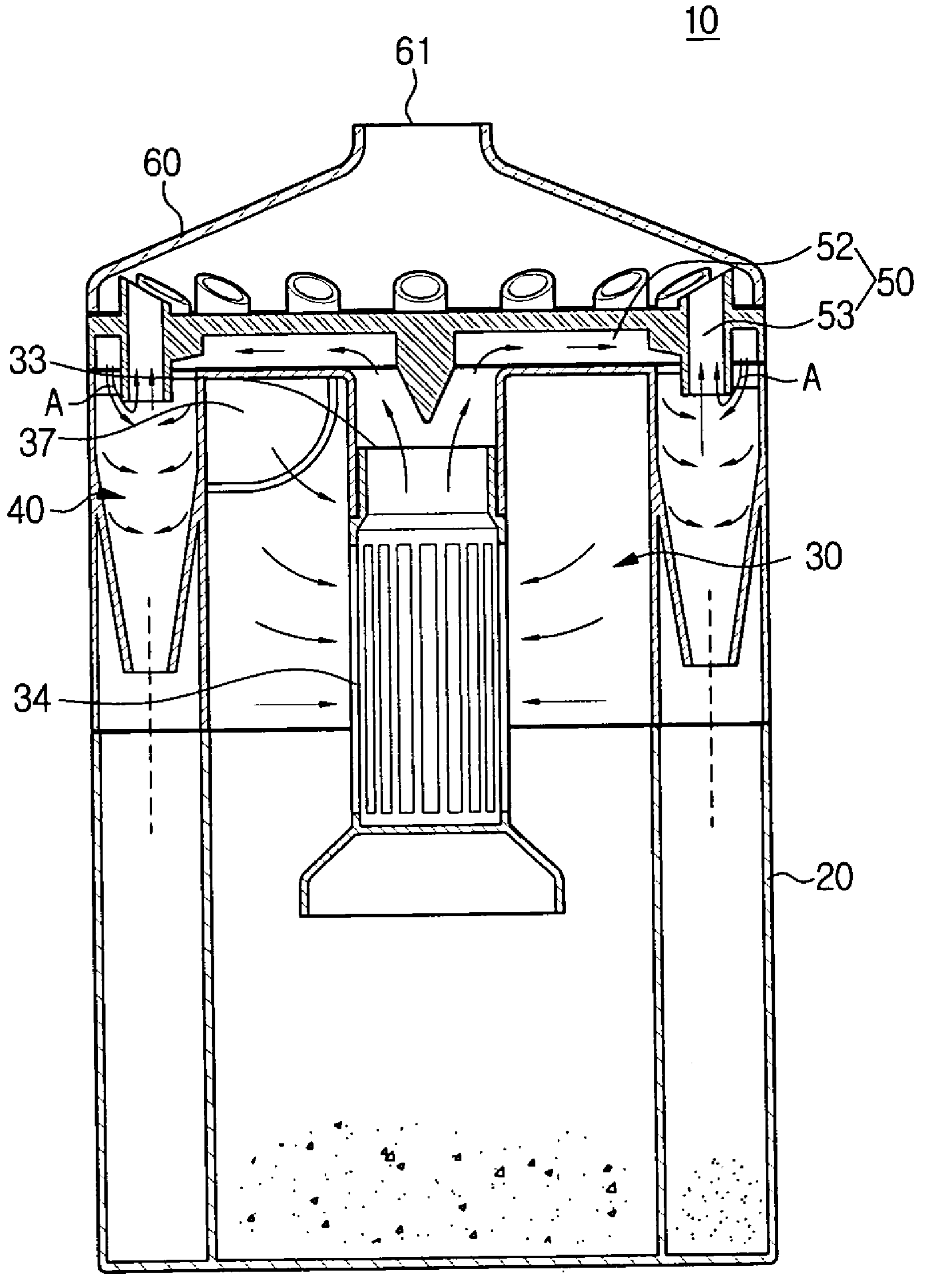
FIG. 1 (PRIOR ART)
FIG. 1 is a cross-sectional view illustrating a conventional multi-cyclone dust separating apparatus.

As described above, in the conventional multi-cyclone dust separating apparatus using the grill member 34 (refer to FIG. 1), the air supplied from the grill member 34 is mixed together in the grill member 34, thereby generating an eddy current. As a result, a pressure drop is generated within the grill member 34, which reduces the suction force. However, in accordance with the present invention, the air and dusts passing through the minute holes 341 a are not mixed in the grill member 340 due to the air guide member 344, but rather is upwardly guided to the air outflow hole 330 without generating an eddy current. Thus, reduction of the suction force can be minimized.

Still referring to FIGS. 2 and 3, an isolating member 350 is coupled to the bottom end of the first chamber outer wall 320. The end of the isolating member 350 is connected to the inside surface of the dust collecting housing 200. The isolating member 350 isolates the inside of the dust collecting housing 200 in order to individually collect the impurities separated from the air in the primary cyclone 300 and the secondary cyclones 400.

On the other hand, a cyclone housing 370 has cyclone insertion holes 371 outside the first chamber outer wall 320 into which the plurality of secondary cyclones 400 are inserted. When the primary cyclone 300 and the secondary cyclones 400 are coupled in the dust collecting housing 200, the plurality of cyclones 400 are inserted into the cyclone insertion holes 371, and the cyclone housing 370 surrounds the predetermined portions of the upper portions of the cyclones 400. The inflow port 372 is installed in the cyclone housing 370 to correspond to the through hole 220 of the dust collecting housing 200. The inflow port 372 is extended to the first chamber outer wall 320, for supplying the outside air sucked through the through hole 220 to the primary cyclone 300.

The secondary cyclones 400 are disposed on an outer circumference of a plate-shaped support body 401 having an opening on its center at predetermined intervals. In the case that the secondary cyclones 400 are inserted into the dust collecting housing 200, the secondary cyclones 400 are installed on the outer circumference of the first chamber outer wall 320 of the primary cyclone 300.

Each of the plurality of secondary cyclones 400 includes a second chamber outer wall 420 composing a secondary cyclone chamber 410, and an air inflow hole 430. The second chamber outer walls 420 are formed in an inverse circular conical shape having their diameter downwardly reduced and their one end partially cut. The air containing the minute impurities that have not been filtered in the primary cyclone 300 is descended to form a rotary current in the secondary cyclone chambers 410. The minute impurities contained in the air are centrifugally separated and discharged to the bottom ends of the second chamber outer walls 420. The air whose impurities have been centrifugally separated and removed in the secondary cyclone chambers 410 is discharged through discharge guide tubes 530 of the inflow/outflow cover 500.

Figure 5:
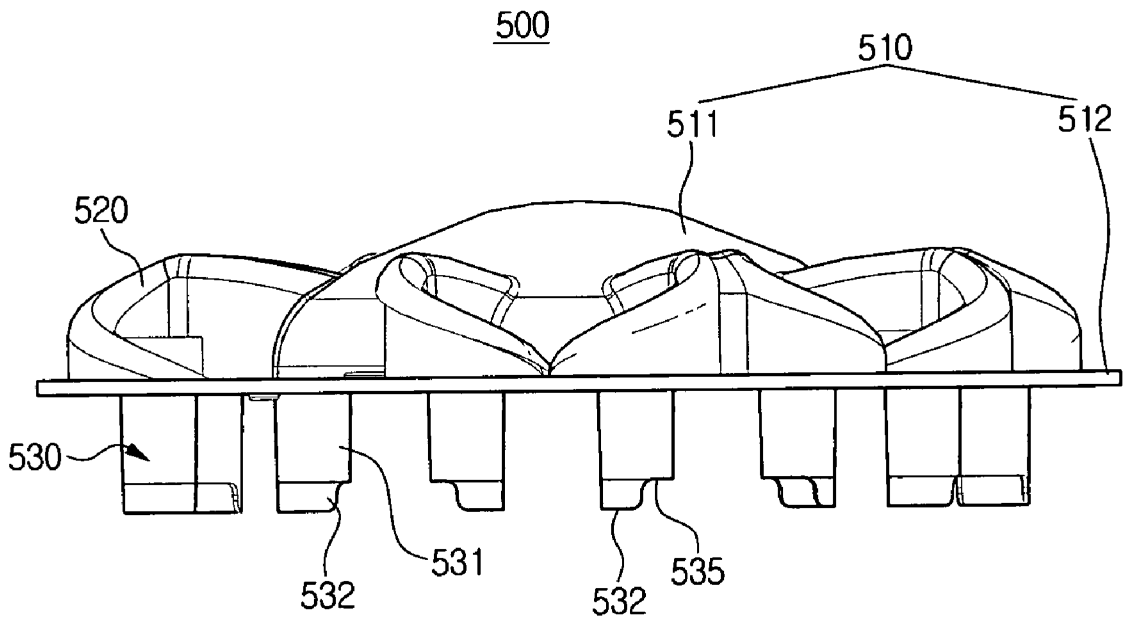
FIG. 5 is a front view illustrating an inflow/outflow cover of FIG. 2.
Figure 6:
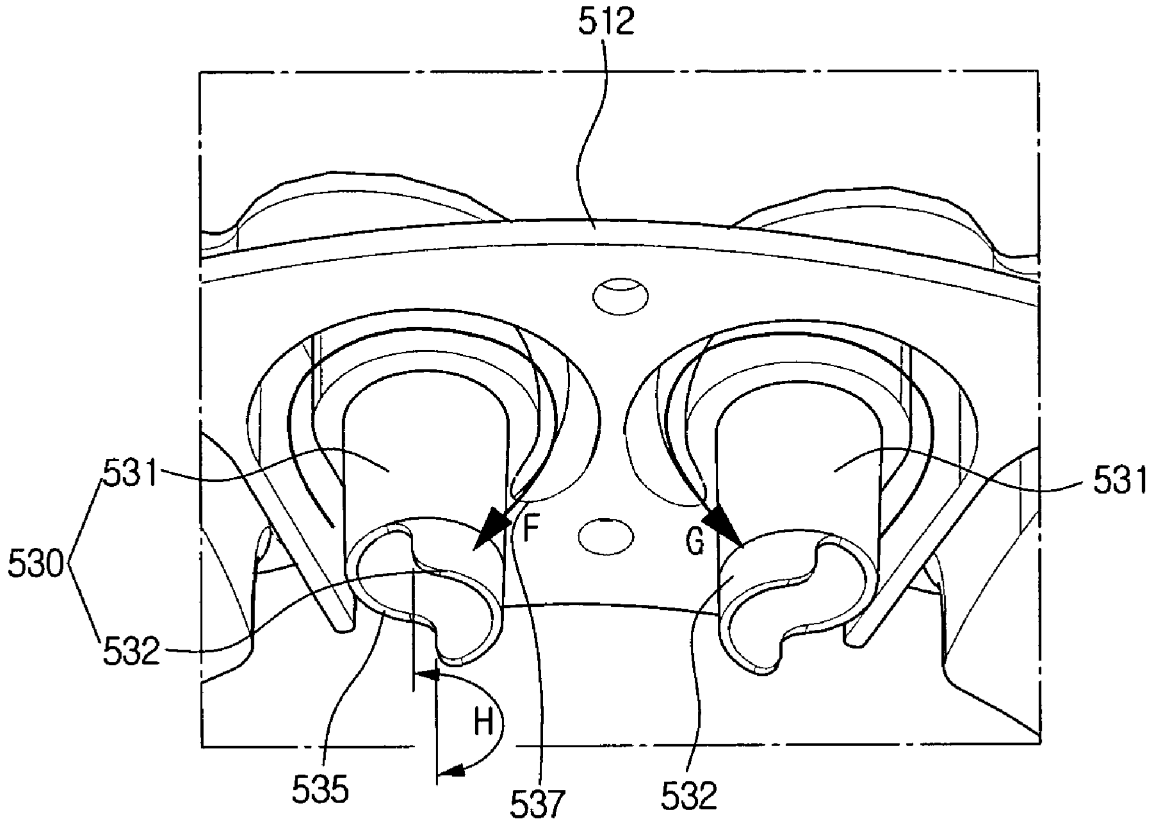
FIG. 6 is a bottom enlarged perspective view illustrating major elements of FIG. 5.

As illustrated in FIGS. 2, 5 and 6, the inflow/outflow cover 500 includes an inflow/outflow cover body 510, inflow guide paths 520, and discharge guide tubes 530.

The inflow/outflow cover body 510 includes an air guide unit 511 protruded from the center in a hemispherical shape having a predetermined radius, and a plate-shaped support unit 512 disposed around the air guide unit 511. The diameter of the air guide unit 511 is almost identical to the diameter of the air outflow hole 330 of the primary cyclone 300. The air discharged through the air outflow hole 330 is ascended to the air guide unit 511.

The inflow guide paths 520 are disposed in the radial direction from the air guide unit 511. The inflow guide paths 520 link the air outflow hole 330 of the primary cyclone 300 to the air inflow holes 430 of the secondary cyclones 400. Also, the inflow guide paths 520 are extended from the outside surface of the air guide unit 511 to the support unit 512 in a downwardly-inclined spiral shape. The air discharged through the air outflow hole 330 is induced as small air flow in the radial direction in the air guide unit 511 by the inflow guide paths 520, and supplied to each secondary cyclone 400.

The discharge guide tubes 530 are formed in a tube shape having a predetermined length and pass through the support unit 512 of the inflow/outflow cover body 510 in the vertical direction. When the inflow/outflow cover 500 is coupled to the upper portions of the secondary cyclones 400, the predetermined portions of the discharge guide tubes 530 downwardly protrude from the support unit 512 into the secondary cyclones 400. Accordingly, the air whose minute impurities have been centrifugally separated in the secondary cyclone chambers 410 of the secondary cyclones 400 ascends and discharged through the discharge guide tubes 530.

As shown in FIG. 5, the portions of the discharge guide tubes 530 downwardly protruding from the support unit 512 include cylindrical portions 531 having a predetermined length and intercepting portions 532 extending from the bottom ends of the cylindrical portions 53 1.

Preferably, the intercepting portions 532 may be circular-arc-shaped. Each of the intercepting portions 532 is formed by cutting a cylinder having the same diameter as the cylindrical portion 531 approximately in half. That is, the length of the circular arc of the intercepting portion 532 ranges from ⅓ to ⅔, preferably, about ½ of the circular circumference of the cylindrical portion 531. The intercepting portions 532 serve to prevent the air supplied to the secondary cyclones 400 through the inflow guide paths 520 from being directly discharged to the discharge guide tubes 530. As illustrated in FIG. 6, the intercepting portions 532 are connected to or integrally formed with the cylindrical portions 531 under the end points 537 of the air inflow holes 430 of each secondary cyclone 400. That is, the intercepting portions 532 are installed at the lower ends of the cylindrical portions 531 vertically under the end points 537 of the air inflow holes 430, and the cutting units 535 are installed at the lower ends of the cylindrical portions 531 under the opposite sides to the end points 537 of the air inflow holes 430.

In general, a suction motor (not shown) for generating a suction driving source is connected to a discharge port 610 of the cyclone cover 600. The suction force of the suction motor is transmitted through the discharge guide tubes 530. On the other hand, the air supplied to the secondary cyclones 400 through the inflow guide paths 520 must descend to the lower portions of the secondary cyclones 400, forming the rotary current, and ascend and discharge through the discharge guide tubes 530. However, in the conventional art, the air discharged from the inflow guide paths is directly discharged to the discharge guide tubes by the suction force of the suction motor (not shown). Thus in the conventional art, the air containing the impurities is not centrifugally separated in the secondary cyclones but directly externally discharged from the multi-cyclone dust separating apparatus.

In accordance with the present invention, as indicated by arrows F and G of FIG. 6, the air supplied to the secondary cyclones 400 through the inflow guide paths 520 collides with the intercepting portions 532. Therefore, the air is not directly supplied to the discharge guide tubes 530, but descends to the secondary cyclones 400, forming the rotary current. On the other hand, since the intercepting portions 532 are formed in a circular arc shape, the intercepting portions 532 can minimize the pressure drop of the air.

Figure 7:
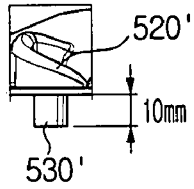
FIG. 7 is a table showing the pressure drop and the dust collecting efficiency of the multi-cyclone dust separating apparatus of the present invention and the conventional multi-cyclone dust separating apparatuses.
Figure 7:
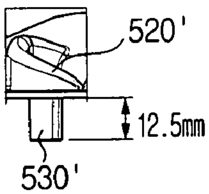
Figure 7:
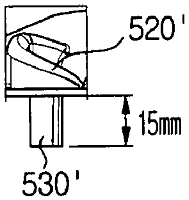
Figure 7:
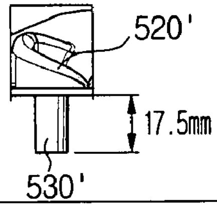
Figure 7:
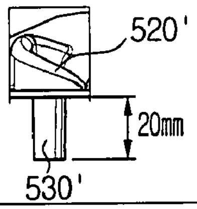
Figure 7:
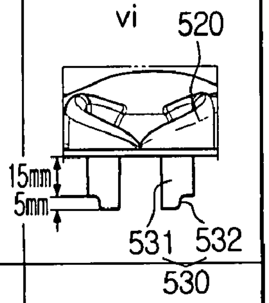

FIG. 7 shows experimental data of the dust collecting efficiency and the pressure drop of the multi-cyclone dust separating apparatuses using the discharge guide tubes 530 of the present invention and the general discharge guide tubes 530 that do not have the intercepting portions 532.

Referring to FIG. 7, columns (i) to (v) show discharge guide tubes 530' that do not have the intercepting portions 532. Here, the shape and length of the inflow guide paths 520' are identical and the length of the discharge guide tubes 530' are different. The discharge guide tubes 530' are formed in a cylindrical shape. Column (vi) shows the discharge guide tubes 530 having the intercepting portions 532 in accordance with the present invention. The pressure drop shown in millimeters of water illustrates the numerical values of the pressure drop of the air when the air is sucked by the same suction motor with the same power. The dust collecting efficiency shows the impurity filtering efficiency of the multi-cyclone dust collecting device 100 in percent (%) unit. For example, when 100 g of impurities are supplied to the multi-cyclone dust collecting device 100, if the amount of the impurities that are not externally discharged but collected in the dust collecting housing 200 is 95 g, the dust collecting efficiency is 95%.

In the case that the discharge guide tubes 530' do not have the intercepting portions 532 as in columns (i) to (v), when the discharge guide tubes 530' are lengthened, the dust collecting efficiency is improved. That is, when the discharge guide tubes 530' are lengthened, less of the air supplied to the secondary cyclones 400 is supplied to the discharge guide tubes 530'. However, when the length of the discharge guide tubes 530' exceeds 15 mm, the pressure drop increases. That is, when the discharge guide tubes 530' are lengthened, the air supplied to the secondary cyclones 400 collides more with the discharge guide tubes 530'.

Conversely, when the discharge guide tubes 530' have the intercepting portions 532 as in column (vi), the dust collecting efficiency is improved and the pressure drop is remarkably reduced. On the other hand, the length of the intercepting portions 532 is preferably about ⅓ of the length of the cylindrical portions 531, but can be ¼ to ½. When the intercepting portions 532 are shortened, more of the air is supplied to the discharge guide tubes 530, to reduce the suction efficiency, and when the intercepting portions 532 are lengthened, the air supplied to the secondary cyclones 400 collides more with the intercepting portions 532, to increase the pressure drop. In this experiment, the length of the cylindrical portions 531 was set to be 15 mm showing the minimum pressure drop among column (i) to (v), and the length of the intercepting portions 532 was set to be 5 mm, namely, ⅓ of the length of the cylindrical portions 531.

Referring back to FIG. 2, the cyclone cover 600 is coupled to cover the inflow/outflow cover 500, and includes the discharge port 610 for collecting the air from the plurality of discharge guide tubes 530 and externally discharging the air from the multi-cyclone dust separating apparatus 100. The suction motor (not shown) of the vacuum cleaner for proving the suction force is directly or indirectly connected to the discharge port 610.

The operation of the multi-cyclone dust separating apparatus 100 in accordance with the present invention will now be described with reference to FIG. 3.

When the suction motor (not shown) of the vacuum cleaner is driven, the air containing the impurities is supplied to the primary cyclone 100 through the inflow port 372 (refer to FIG. 2). The air is descended in the primary cyclone chamber 310, forming the rotary current. The relatively large impurities of the air are centrifugally separated, descended and collected in the dust collecting housing 200. The air whose large impurities have been removed is ascended again, passed through the side 341 of the grill member 340, guided by the air guide member 344, and discharged through the air outflow hole 330.

The air ascended through the air outflow hole 330 is diffused by collision with the air guide unit 511, and supplied to each secondary cyclone 400 through the inflow guide paths 520. Here, the air discharged through the air inflow holes 430 is not directly supplied to the discharge guide tubes 530 by the intercepting portions 532 of the discharge guide tubes 530 but guided to the lower portions of the secondary cyclone chambers 410. The air is descended, forming the rotary current. The minute impurities of the air that have not been separated in the primary cyclone 300 are centrifugally separated, descended and collected in the dust collecting housing 200.

The air whose minute dusts have been removed is ascended and discharged through the discharge guide tubes 530. The air discharged from each discharge guide tube 530 is mixed in the cyclone cover 600, and externally discharged from the multi-cyclone dust separating apparatus 100 through the discharge port 610.

Although not illustrated, the multi-cyclone dust separating apparatus 100 in accordance with the present invention can be selectively applied to various types of cleaners, such as upright type or canister type vacuum cleaners.

The multi-cyclone having the primary cyclone and the plurality of secondary cyclones has been explained in the above embodiment. However, the present invention can be applied to any kinds of cyclone dust separating apparatuses including the discharge guide tubes 530 having the intercepting portions 532 and the cylindrical portions 531 (refer to FIG. 5). That is, it is easily understood by those skilled in the art that the present invention can be applied to the cyclone dust separating apparatus having one cyclone including an air inflow hole (not shown) for forming a rotary current like the inflow guide paths, a cyclone body (not shown) for providing an airtight space for separating impurities by rotating the sucked air, and a discharge guide tube 530 having cylindrical portions and intercepting portions, and guiding the air from the cyclone body.

As discussed earlier, in accordance with the present invention, in the multi-cyclone dust separating apparatus, since the intercepting portions are formed at the bottom ends of the cylindrical portions, the sucked air is not directly discharged to the discharge guide tubes.

In addition, in the multi-cyclone of the above embodiment, the air supplied to the secondary cyclones is not directly discharged to the discharge guide tubes, by installing the predetermined length of intercepting portions of the discharge guide tubes for discharge the air of the secondary cyclones at the lower portions of the ends of the air inflow holes of the secondary cyclones. As a result, the dust collecting efficiency is improved, and the air pressure drop is reduced by restricting collision of the sucked air and the discharged air.

Furthermore, since the air guide member for guiding ascent of the air is installed in the grill member, the air flow is constantly maintained in the grill member by restricting generation of the eddy current, thereby preventing the pressure drop.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A multi-cyclone dust separating apparatus, comprising:

a primary cyclone for centrifugally separating impurities from the sucked air;

a plurality of secondary cyclones for centrifugally separating impurities from the air supplied from the primary cyclone;

inflow guide paths for guiding the air discharged from the primary cyclone to the plurality of secondary cyclones; and discharge guide tubes partially inserted into the plurality of secondary cyclones, for externally discharging the air from the plurality of secondary cyclones, wherein the discharge guide tubes comprise cylindrical portions and intercepting portions extending from bottom ends of the cylindrical portions for preventing the air supplied to the plurality of secondary cyclones from being directly discharged to the discharge guide tubes, wherein the primary cyclone comprises a cylindrical grill member installed on an air outflow hole through which the air is discharged, the cylindrical grill member preventing backflow of impurities, and wherein the grill member comprises an air guide member protruded from the bottom of the grill member, the air guide member guiding the air passing through the grill member to the air outflow hole.

2. The multi-cyclone dust separating apparatus as claimed in claim 1, further comprising an inflow/outflow cover installed on the top ends of the secondary cyclones, wherein the plurality of secondary cyclones are disposed at an outer circumference of the primary cyclone at predetermined intervals, and the inflow guide paths and the discharge guide tubes are integrally formed on the inflow/outflow cover.

3. The multi-cyclone dust separating apparatus as claimed in claim 1, wherein the intercepting portions are installed at the bottom ends of the cylindrical portions vertically under end points of air inflow holes of the plurality of secondary cyclones.

4. The multi-cyclone dust separating apparatus as claimed in claim 3, wherein the intercepting portions are circular-arc-shaped.

5. The multi-cyclone dust separating apparatus as claimed in claim 4, wherein the intercepting portions have a length of the circular arc that substantially ranges from ⅓ to ⅔ of a circular circumference of the plurality of cylindrical portions.

6. The multi-cyclone dust separating apparatus as claimed in claim 3, wherein the intercepting portion have a height that substantially ranges from ¼ to ½ of a height of the plurality of cylindrical portions.

7. The multi-cyclone dust separating apparatus as claimed in claim 1, wherein the air guide member divides an inside area of the grill member into a plurality of areas.

8. The multi-cyclone dust separating apparatus as claimed in claim 7, wherein the air guide member has a cross-shaped section to divide the inside area of the grill member into four areas.

9. A cyclone dust separating apparatus, comprising:

a cyclone body having an air inflow hole through which outside air containing impurities is sucked; and a discharge guide tube for discharging the air from the cyclone body, the discharge guide tube including a cylindrical portion and an intercepting portion, the intercepting portion extended from a bottom end of the cylindrical portion for preventing the air supplied to the cyclone body from being directly discharged to the discharge guide tube, wherein the intercepting portion has an outer diameter equal to an outer diameter of the cylindrical portion.

10. The cyclone dust separating apparatus as claimed in claim 9, wherein the intercepting portion is installed at the bottom end of the cylindrical portion vertically under an end point of the air inflow hole of the cyclone body.

11. The cyclone dust separating apparatus as claimed in claim 10, wherein the intercepting portion is circular-arc-shaped.

* * * * *